US008543633B2

(12) United States Patent
Miller (10) Patent No.: US 8,543,633 B2
(45) Date of Patent: Sep. 24, 2013

(54) MODIFIED GRAM-SCHMIDT CORE IMPLEMENTED IN A SINGLE FIELD PROGRAMMABLE GATE ARRAY ARCHITECTURE

(75) Inventor: Luke A. Miller, Canastota, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 547 days.

(21) Appl. No.: 12/889,988

(22) Filed: Sep. 24, 2010

(65) Prior Publication Data

US 2012/0078988 A1    Mar. 29, 2012

(51) Int. Cl.
*G06F 7/32*    (2006.01)

(52) U.S. Cl.
USPC .......................................... 708/520; 708/607

(58) Field of Classification Search
USPC ................................. 708/520, 607
See application file for complete search history.

(56) References Cited

U.S. PATENT DOCUMENTS

| 7,716,454 | B2 | 5/2010 | Fitton | |
| 2005/0237971 | A1 | 10/2005 | Skraparlis | |
| 2009/0003476 | A1* | 1/2009 | Rog et al. | 375/260 |
| 2009/0154600 | A1* | 6/2009 | Kim et al. | 375/320 |
| 2011/0040822 | A1* | 2/2011 | Eichenberger et al. | 708/607 |

OTHER PUBLICATIONS

P. N. Ganchosov, G.K. Kuzmanov, H. Kabakchiev, V. Behar, R. P.Romansky, G. N. Gaydadjiev, "FPGA Implementation of Modified Gram-Schmidt QR-Decomposition", Proceedings of the 3rd HiPEAC Workshop on Reconfigurable Computing, Paphos, Cyprus, Jan. 2009, pp. 41-51.
A. Irturk, S. Mirzaei, R. Kastner, "FPGA Implementation of Adaptive Weight Calculation Core Using QRD-RLS Algorithm", UCSD Technical Report 2009-0937. (http://cseweb.ucsd.edu/~airturk/core/adaptive_weight.pdf) Last accessed, Mar. 17, 2011.
A. Irturk, S. Mirzaei, R. Kastner, "An Efficient FPGA Implementation of Scalable Matrix Inversion Core using QR Decomposition", UCSD Technical Report 2009-0938. (http://cseweb.ucsd.edu/~airturk/core/matrix_QRD.pdf) Last accessed, Mar. 17, 2011.

* cited by examiner

*Primary Examiner* — Tan V. Mai
(74) *Attorney, Agent, or Firm* — Howard IP Law Group, PC (57) ABSTRACT

A modified Gram-Schmidt QR decomposition core implemented in a single field programmable gate array (FPGA) comprises a converter configured to convert a complex fixed point input to a complex floating point input, dual port memory to hold complex entries of an input matrix, normalizer programmable logic module (PLM) to compute a normalization of a column vector. A second PLM performs complex, floating point multiplication on two input matrix columns. A scheduler diverts control of the QRD processing to the normalizer PLM or the second PLM. A top level state machine communicates with scheduler and monitors processing in normalizer PLM and second PLM and communicates the completion of operations to scheduler. A complex divider computes final column for output matrix Q using floating point arithmetic. Multiplexer outputs computed values as elements of output matrix Q or R. Complex floating point operations are performed in a parallel pipelined implementation reducing latencies.

15 Claims, 10 Drawing Sheets

AFTER BEAM FORMING

BEFORE BEAM FORMING

Fig. 11

MODIFIED GRAM-SCHMIDT CORE IMPLEMENTED IN A SINGLE FIELD PROGRAMMABLE GATE ARRAY ARCHITECTURE

FIELD OF THE INVENTION

The present invention relates to digital signal processing. More Particularly, the present invention relates to QR decomposition in an architecture suitable for implementation in a field programmable gate array (FPGA).

BACKGROUND

In many areas of technology, including but not limited to areas of signal processing such as undersea acoustic signal processing, wireless communications, and image processing. One well-known technique for solving such problems is the use of QR-decomposition (QRD). QR decomposition of a matrix is a decomposition of the matrix into an orthogonal matrix, Q and an upper triangular matrix, R. QR decomposition is often used to solve the linear least squares problem.

An information bearing signal such as a communications signal, sonar signal, or target radar signal, contains multiple signal components. Received signals carry relevant information useful for communications and detection of sources (e.g. targets), such as radar or sonar signals. However, in addition to the useful information carried by a received signal, clutter and/or noise signals embedded within the overall received signal tend to interfere with and reduce the likelihood of detection and/or degrade the quality of the useful information signal to be recovered. Clutter or noise may originate from extraneous energy sources, or may result from interference between multiple useful signals.

It is important to separate the useful signals from the clutter and noise in the overall received signal. Once useful signals are identified and located, receive antenna beams may be weighted to direct energy to the location of the target sources and mitigate the effects of interference and other electromagnetic phenomena (e.g. side lobes).

One method of separating noise from a useful (target) signal is by implementing a modified Gram Schmidt (MGS) algorithm for performing a QR decomposition (QRD). The MGS QRD utilizes signal information such as signal data from a radar receiver in the format of an m×n input matrix A, and factorizes A into an orthogonal matrix Q, and an upper triangular matrix R. The QRD is a numerically stable technique that is well suited for the computation of the least squares error estimates for an unknown and finite impulse response by minimizing the total squared error between the desired signal and the actual received signal over a certain time period.

The MGS QRD is useful for identifying a target signal contained in an overall received signal, and requires fewer operations to perform the decomposition than other approaches (such as Householder reflection or Givens rotation). However, the MGS approach requires a significant number of floating point operations. It is necessary to use floating point values to maintain the decimal accuracy of the MGS QRD. FPGA implementations, however, generally are limited to fixed point arithmetic operations which introduce rounding errors resulting in a loss of accuracy and ultimately the orthogonality of Q.

An MGS-QRD is conventionally implemented using multiple processor cards to provide the floating point arithmetic operations needed to compute the MGS algorithm, with the calculation results then passed to the MGS core. The complex mathematical operations for floating point complex numbers are too intensive to be incorporated within hardware devices alone and are meted out to software modules. The software modules direct the calculations to a separate processor better suited for performing floating point calculations. However, such an implementation and processing with software is typically achieved at the expense of decreased processing speed (relative to purely hardware implementations). Alternative techniques for implementation of an MGS QRD within a single FPGA using floating point arithmetic operations are desired.

SUMMARY

A processor for performing a QR decomposition (QRD) according to a modified Gram-Schmidt (MGS) QRD in a single field programmable gate array (FPGA) includes a converter configured to convert a complex fixed point input to a complex floating point input. A dual port memory is coupled to the converter and configured to hold complex entries of an input matrix of pre-determined size. A normalizer programmable logic module (PLM) is configured to compute a normalization of an input matrix column vector. A second PLM is coupled to the memory and configured to perform a complex multiplication operation using floating point arithmetic on input matrix columns to compute at least one element of an output matrix R and to further compute an intermediate column of an output matrix Q. A scheduler is coupled to the normalizer PLM and the second PLM and configured to divert control of the QRD processing to one of the normalizer PLM and the second PLM. A top level state machine in communication with the scheduler is configured to monitor processing in the normalizer PLM and the second PLM and communicate the completion of a given operation to the scheduler. A complex divider is coupled to the memory and the normalizer PLM and configured to receive the computed normalization of the input matrix column vector and the intermediate column of the output matrix Q and compute a final column for output matrix Q using floating point arithmetic. A multiplexer is coupled to the complex divider and to the normalizer PLM and is configured to output a computed complex value as an element of one of output matrix Q and output matrix R. The complex floating point operations are performed in a parallel and pipelined implementation that reduces processing latencies.

BRIEF DESCRIPTION OF THE DRAWINGS

This specification may be better understood with reference to the accompanying drawings in which like numbers represent like components and in which.

DETAILED DESCRIPTION

Figure 1:
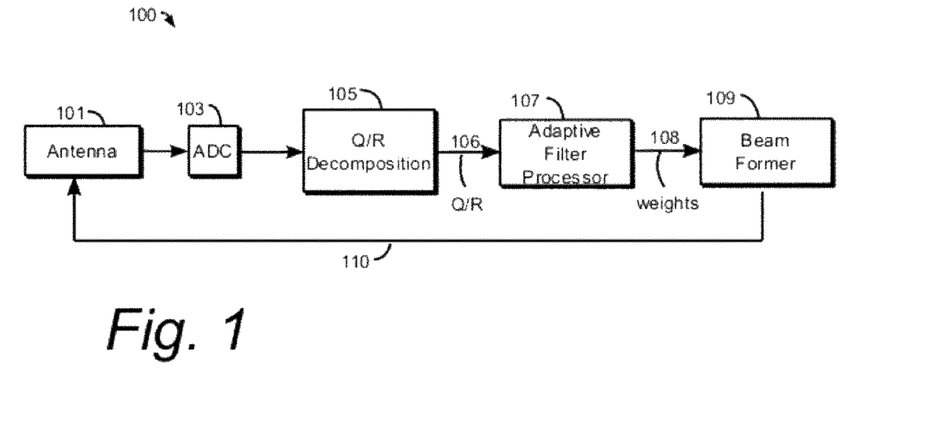
FIG. 1 is a block diagram of a beamforming procedure using adaptive filtering.

FIG. 1 is a block diagram 100 showing a beam former using adaptive filtering. Electromagnetic signals are received at an antenna 101. The antenna 101 receives the electromagnetic signals and converts these signals into electrical signals. The electrical signals are processed in an analog to digital converter (ADC) 103 to provide a digital representation of samples taken from the electromagnetic signals received at the antenna 101. The electromagnetic signals, in the form of digital samples, are arranged in an input matrix. The input matrix is decomposed into a unitary matrix Q and an upper triangular matrix R through a QR decomposition 105. The QR decomposition 105 may be implemented through one of a number of known algorithms. For example, a Householder reflection, a Givens Rotation, or a Modified Gram-Schmidt process may be used to perform the QR decomposition 105. The QR process is used to remove the desired signal from noise which is also detected by the antenna 101.

The Q and R matrices 106 computed by the QR decomposition 105 are then used as inputs to an adaptive filter processor 107 which filters out the main signal received at antenna 101. The adaptive filter processor 107 computes weights 108 based on the determination of the main signal. The weights 108 calculated by the adaptive filter processor 107 are fed to a beam former circuit 109. The beam former circuit 109 provides a beam steered signal 110 to antenna 101 for focusing the reception energy of the antenna 101 on the area in which the strongest received signal is detected through the adaptive filtering.

Figure 2:
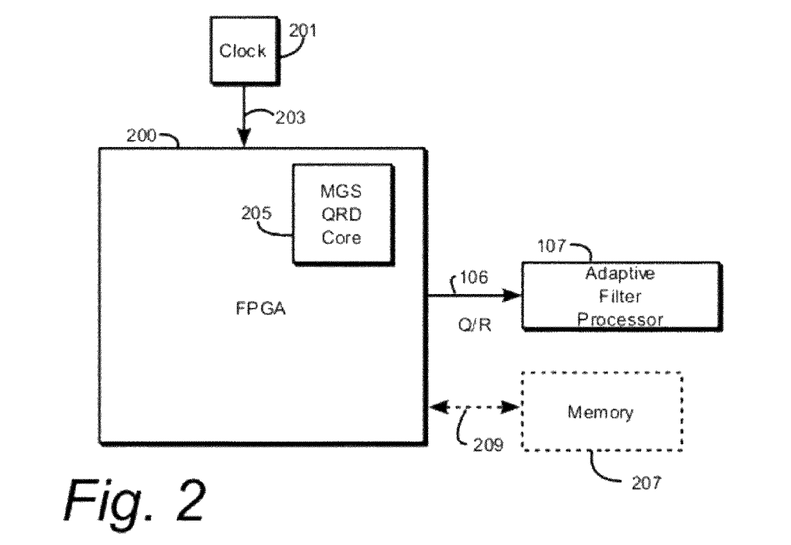
FIG. 2 is a block diagram of a QR decomposition core implemented in an FPGA.

FIG. 2 is a block diagram of a modified Gram-Schmidt (MGS) core 205 for performing a QR decomposition 105 implemented in a field programmable gate array (FPGA) 200. The FPGA 200 is a semi-conductor device containing a plurality of logic units that may be programmed after the device is manufactured. Logic gates and memory components may be user-defined and interconnected to provide functionality from complex combinational functions to simple logic gates. The FPGA 200 operates on a clock signal 203 that is provided by an external clock circuit 201. Implemented within the logic blocks of the FPGA 200, is a MGS core 205 configured to perform a QR decomposition 105 based on the MGS algorithm. In an exemplary embodiment, the MGS algorithm is chosen because of its numerical stability when compared to other QR decomposition 105 methodologies. To preserve the numerical stability of the MGS algorithm, floating point values are used to provide the necessary decimal accuracy for performing iterative division operations on floating point data. The use of fixed point math in an MGS algorithm leads to rounding errors that are compounded through iterative operations resulting in algorithm outputs that are not useful.

As described with respect to FIG. 2, the MGS core 205 decomposes an input Matrix, A, into a unitary matrix Q, and an upper triangular matrix R 106 which are used as input to an adaptive filter processor 107. In an embodiment of an MGS core 205 implemented in an FPGA 200, a external memory 207 may be used to provide storage for an input matrix of a size that may exceed the storage capacity within the FPGA. The external memory 207 is coupled to the FPGA 200 through an appropriate interface 209. The input matrix A may be read from external memory 207, processed by the MGS core 205 to calculate values for matrices Q and R, the calculated values of Q and R written back to external memory 207 through interface 209.

Figure 3:
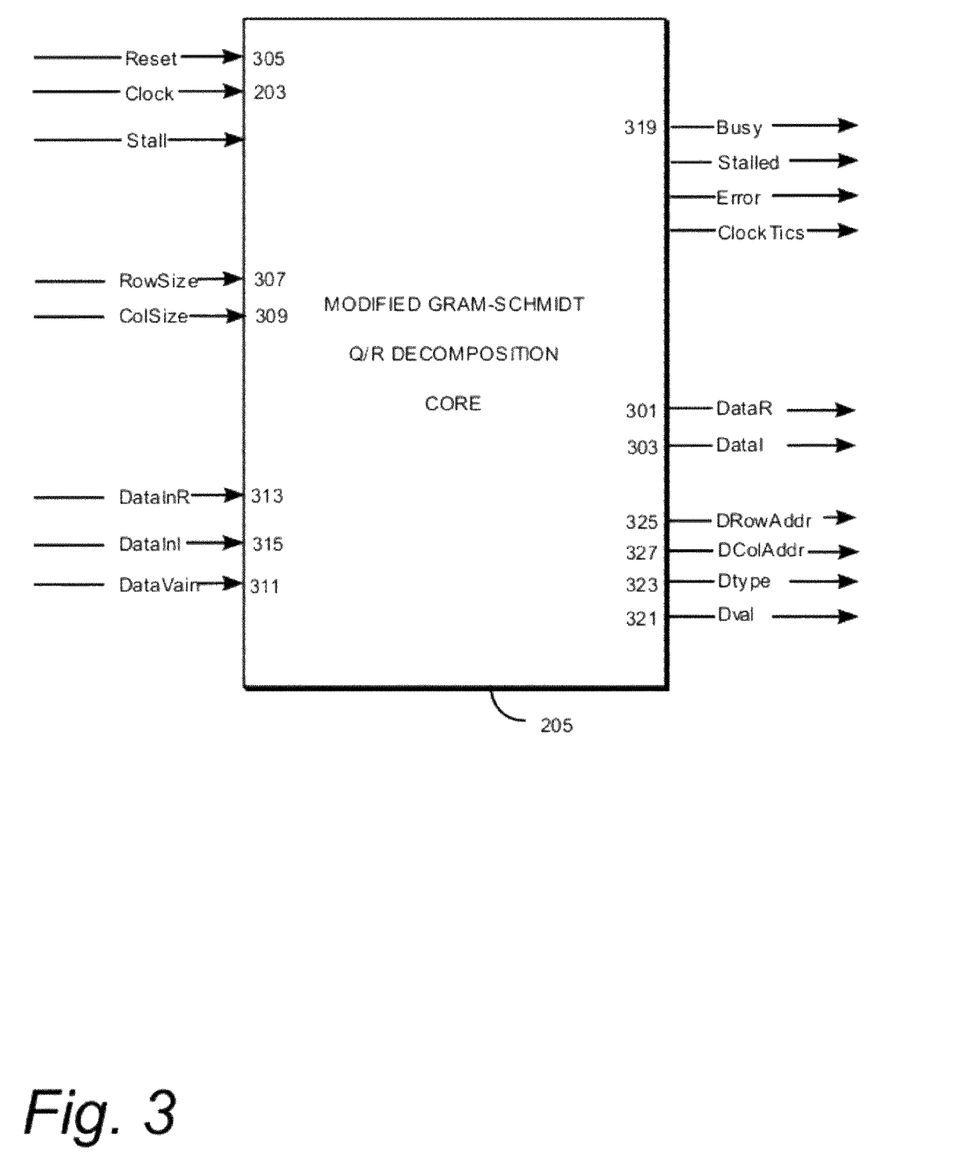
FIG. 3 is a block diagram of an MGS core implemented in a single FPGA.

Referring to FIG. 3, there is illustrated an example of a Modified Gram-Schmidt QR decomposition core 205 according to one embodiment of an MGS QRD core implemented in an FPGA. Inputs are shown to the left side of the MGS QRD core block 205. Output control signals and data representing matrices Q and R are shown to the right of the MGS QRD core block 205. The inputs and outputs to/from the MGS QRD core 205 may be better understood with reference to Table 1.

Core Signal Assignments

TABLE 1

| Signal Name | Direction/Sense | Description |
| --- | --- | --- |
| reset | Input Active High | Resets Core to known state. Invoke each time the core is used to solve a particular matrix. |
| clock | Input | Clock, from DCM source. |
| busy | Output Active High | Core is Busy. Do not Load data until busy is Low. After all the columns have been loaded core will go busy. |
| RowSize | Input Integer | Number of Rows of Matrix A. This value can only be changed when core is not busy and dvain is low. Thus can only be changed before decomposition, not during. |
| ColSize | Input Integer | Number of Columns of Matrix A. This value can only be changed when core is not busy and dvain is low. Thus can only be changed before decomposition, not during. |
| DataInR | Input 16 bits | Real Data input. Signed 16.0 format. Written to the core memory when dvain is high. |
| DataInI | Input 16 bits | Imaginary input. Signed 16.0 format. Written to the core memory when dvain is high. |
| dvain | Input Active High | The write enable to the MGS core memory. |
| DataR | Output 32 bits | Real single precision floating point. Either Q or R depending on the Dtype Flag. |
| DataI | Output 32 bits | Imaginary single precision floating point. Either Q or R depending on the Dtype Flag. |
| DColAddr | Output Integer | The Column address of the current DataR, DataI. Valid when Dval is high. This can be thought of the Vector address. |
| DRowAddr | Output Integer | The Row address of the current DataR, DataI. Valid when Dval is high. This can be thought of the Vector address. |
| Dval | Output Active High | Output data, Dtype and address are valid. |

TABLE 1-continued

| Signal Name | Direction/ Sense | Description |
| --- | --- | --- |
| Dtype | Output Active High | High = R data, Low = Q data |
| stall | Input Active High | Stall the QRD engine. This allows the user to regulate the data rate coming out of the QRD engine to match various interface rates. Must hold high until stalled goes high. Can hold for as long as you like. |
| stalled | Output Active High | The user has forced the QRD engine to stall. Will wait in this state until stall is brought low. |
| error | Output Active High | The MGS core had an error, overflow, underflow or div by zero. |
| clocktics | Output 32 bits | The # of clocks used to solve the given problem. |

It should be noted that the data outputs for matrices Q and R, DataR 301, DataI 303 (identified as Q or R based on the value of DType) are single precision floating point values. Floating point arithmetic preserves the numerical accuracy of the MGS QRD. By way of example only, and with reference to FIG. 3 and Table 1 above, the MGS core 205 may be utilized as follows: 1) The reset 305 is asserted to reset the MGS core 205 to a known state. 2) The size of the input matrix to be solved may be specified by setting the desired number of rows and number of columns to be solved using the row size (RowSize) 307 and column size (ColSize) 309 inputs. According to an embodiment of the MGS QRD processor, there is no limit to the size of the input matrix that may be solved. External memory 207 may be coupled to the MGS QRD core 205 by an appropriate interface 209 as known in the art to extend the size of the input matrix to virtually any size. It is understood, however, that the amount of time required to compute the decomposition may depend upon the size of the input matrix. 3) Asserting dvain 311 begins writing data to the MGS QRD core 205. The data present on the data lines DataInR 313 and DataInI 315 are real and imaginary floating point inputs, respectively. When present on the rising clock edge 203 associated with a clocking mechanism such as a clock controller 201, the data is written to the core memory. When all the data is written to the core memory, the busy signal 319 will transition (e.g. from low to high). By way of example only, assuming a 256×54 matrix is to be solved, 256×54=13,824 I,R samples need to written to the core memory. 4) The line Dval 321, the Q, R Data Type, 323 and addresses 325, 327 are monitored. 5) When busy 319 transitions (e.g. goes low), the MGS QRD core 205 has completed solving Q and R for the given input matrix. For processing with clock speeds of about 125 MHz, a 256×54 matrix may be decomposed in about 8 milliseconds (ms) in one embodiment of a MGS QRD processor implemented in an FPGA.

The MGS algorithm utilizes a complex matrix A and decomposes A into two matrices Q and R. Matrix Q is unitary and Matrix R is an upper triangular matrix. Accordingly, the following mathematical functions may be represented as:

$$Q^H Q = \text{Identity Matrix} \quad \text{Equation (1)}$$

$$A = Q \times R \quad \text{Equation (2)}$$

Thus, if A represents a 256 row by 54 column matrix, then Q is a 256 row by 54 column matrix and R calculates as a 54 row by 54 column matrix. In an exemplary embodiment of a MGS QRD processor, the MGS algorithm may expressed in terms of two nested FOR loops. The MGS algorithm may be expressed in MATLAB syntax as follows:

$$\text{FOR } i=1{:}n, \quad \text{Equation (3)}$$

$$Q(:,i) = A(:,i); \quad \text{Equation (4)}$$

$$\text{FOR } j=1{:}i-1, \quad \text{Equation (5)}$$

$$R(j,i) = Q(:,j)'{*}Q(:,i); \quad \text{Equation (6)}$$

$$Q(:,i) = Q(:,i) - (R(j,i){*}Q(:,j)); \quad \text{Equation (7)}$$

END $$R(i,i) = \text{norm}(Q(:,i)); \quad \text{Equation (8)}$$

$$Q(:,i) = Q(:,i)/R(i,i); \quad \text{Equation (9)}$$

END

Figure 4:
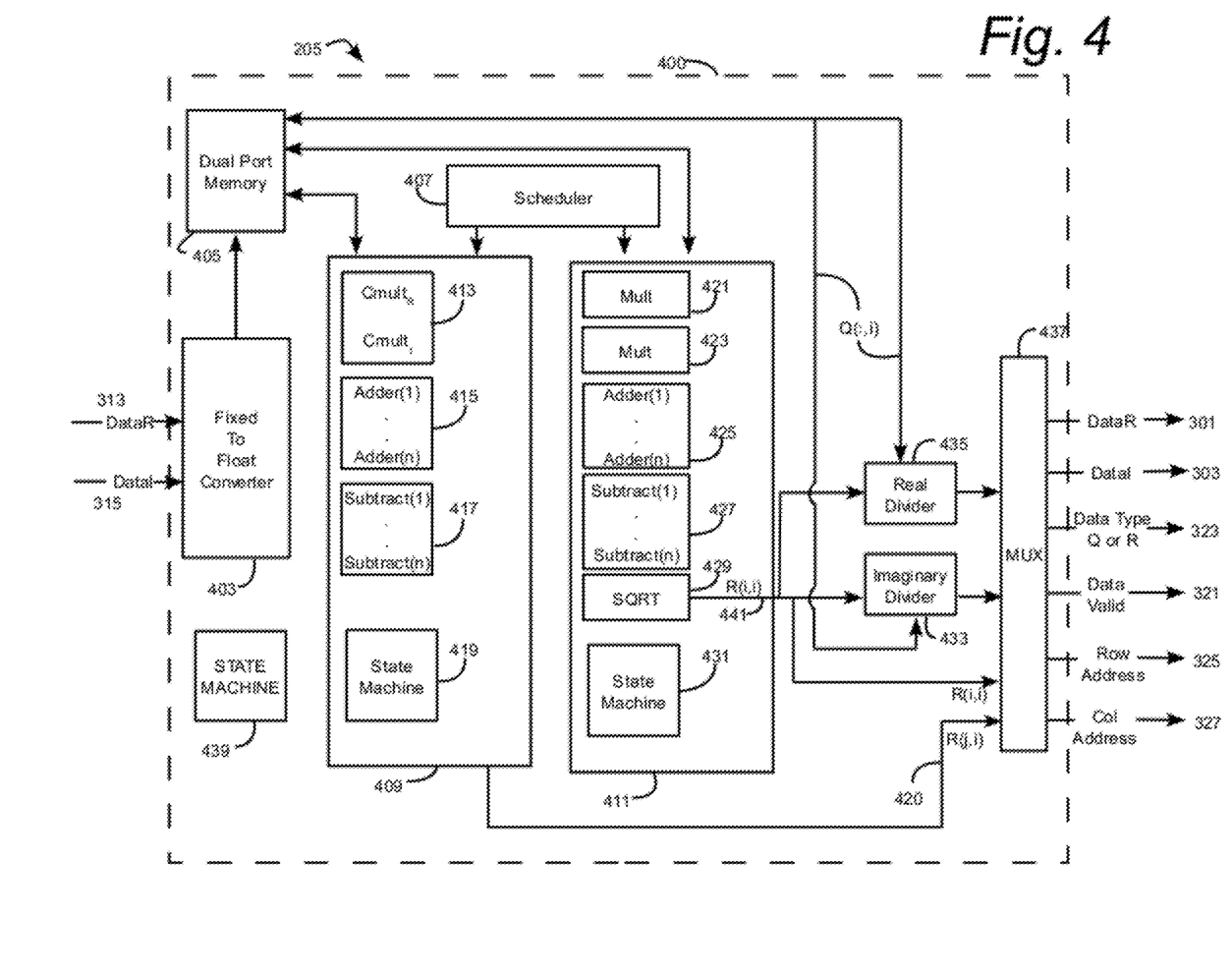
FIG. 4 is a top level functional block diagram of an implementation of an MGS core using floating point arithmetic implemented in a single FPGA.

FIG. 4 is a block diagram of an MGS core 205 implemented in an FPGA 200. Complex data is received as a real component DataInR 313 and an imaginary component DataInI 315 as fixed point values. The fixed point values are converted to floating point values in a fixed to float converter 403. The complex data are elements of an input matrix A stored in dual port memory 405. For example, if a 1024×64 input matrix is to be solved, the dual port memory 405 is a 1064×64 sized memory. The inputs 313, 315 are written to dual port memory 405 beginning in the first column of 1024 elements and continue filling the dual port memory 405 on a column by column basis until the last column (64 in this example) is written. When the input matrix has been completely written to memory, the MGS QRD process initiates.

A top level state machine 439 is in communication with all elements contained in the top level system 400 of the MGS QRD, indicated in dashed lines in FIG. 4. When the specified input matrix has been loaded to the dual port memory 405, the top level state machine 439 communicates with scheduler 407 to determine the next processing step. If the next processing step involves the special case of processing the first input column, the scheduler first performs a normalization procedure on the first column vector. The initial normalization (Equation (8)) is utilized to calculate an initial value of R(i,i) 441 for computing the first iteration associated with Equation (5).

The normalization procedure is performed by normalizer programmable logic module 411. The normalizer programmable logic module 411 includes multiplier 421 which performs a multiplication of the real component of an element of the first column vector. Multiplier 423 performs a multiplication operation on the imaginary portion of the element of the first column vector. Multipliers 421, 423 may be configured to perform a squaring operation by multiplying an input by itself. In an alternate embodiment, a separate squaring function may be defined and used to square input values for the normalization calculation. Normalizer programmable logic module 411 also includes a plurality of adders 425, subtractors 427 and a square root calculator 429 for performing mathematical operations and normalizing received column vectors. Normalizer state machine 431 communicates with all components at the normalizer programmable logic module 411 level and controls flow of computations throughout the normalizing calculation.

The result of the normalization operation is given as R(i,i) 441 as depicted MGS algorithm Equation (8). R(i,i) 441 is output via MUX 437 as a final output value of the output Matrix R. In addition, the computed value of R(i,i) 441 is input to real divider 435 and imaginary divider 433 for subsequent calculations to compute the final columnar values of Q. As the FOR loop of Equation (3) progresses, the normalizer programmable logic module 411 iteratively calculates normalized values for all column vectors in the input matrix A. Processing of each iteration is similar to that described above in regard to the special case for the first column vector.

Scheduler 407 comprises a series of counters, synchronized with each component and module in the MGS core 205. When scheduler 407 determines that the last element of the first column vector has been processed and the final normalized value for R(i,i) is computed, scheduler 407 informs top level state machine 439 of the next processing step. Following the special first column case, an initial value of R(i,i) is computed and is divided into the initial first column vector to output the new first column for Matrix Q (Equation (9)). The newly computed first column is written to dual port memory 405. The top level state machine 439 then receives instructions to process column 2. As illustrated in MSG Equation (6) the R matrix value R(j,i) is calculated as the complex multiplication of two columns Q(:,j) and Q(:,i). The computed R(j,i) value 420 is output through MUX 437. The second column Q(:,i) is written (re-written) to dual port memory 405 based on Equation (7). This calculation is performed iteratively in the inner nested FOR loop at Equations (5)-(7). When the upper range value for the FOR loop index j, has been reached, the R(i,i) value is computed by normalizing the current column vector Q(:,i), (Equation (8)) and the column Q(:,i) is recomputed in Equation (9) and written back to dual port memory 405.

The computations performed in the inner FOR loop as indicated by Equations (5)-(7), are performed in a second programmable logic module 409 containing a plurality of complex multipliers 413, adders 415, subtractors 417 and a local state machine 419 which communicates with all components contained in the programmable logic module 409. When the current column Q(:,i) has been re-computed in Equation (7) and written to dual port memory 405, top level state machine 439 informs the scheduler 407 that control is to return to the normalizer programmable logic module 411. A value for R(i,i) 441 is computed by normalizing the column vector Q(:,i) currently being processed by the FOR loop of Equation (3). The value computed for R(i,i) 441 is output to MUX 437 as well as real divider 435 and imaginary divider 433. The recomputed current column Q(:,i), computed in programmable logic module 409 is read from dual port memory 405 and input to real divider 435 and imaginary divider 433 and divided by the value of R(i,i) 441 to compute the final column Q(:,i) for the output matrix Q. The computed Q column (real and imaginary portions) are output from real divider 435 and imaginary divider 433, respectively, via MUX 437.

As output values are computed by the MGS core 205, they are streamed to downstream processors (e.g. an adaptive filtering processor 107) via MUX 437. The output values include the complex entries of output matrices Q and R. To distinguish and identify the current output value, MGS core 205 is configured to provide along with the data output value, an indication of whether the current output is a real value (DataR) 301, an imaginary value (DataI) 303, the data type 323, (i.e. whether the current output belongs to output matrix Q or output matrix R), a data valid indicator 321 is provided by top level state machine 439 when it is determined that all columns associated with the output value have been processed. a Row address 325 and column address 327 identifying the current output's position in the output matrix identified by the data type 323.

The process described above is performed iteratively, with scheduler 407 shifting control from the programmable logic module 409 and normalizer programmable logic module 411 until all columns specified in the input matrix A have been processed and all calculated outputs have been passed to downstream processing via MUX 437. Upon completion of processing for all specified input columns, busy signal 319 is set low to indicate processing in the MGS core 205 is complete.

As the need increases to perform QRD on larger matrix sizes, latencies associated with the computationally intensive nature of the QRD begin to affect the utility of the QRD implementation. For example, in a radar based adaptive beamforming process, it is desirable to perform the QR decomposition in a matter of milliseconds. Performing all or some of the QRD computations off-chip introduces latency resulting from, for example, cross-chip communication interfaces. Additionally, when computations are performed off-chip, for example, a processor card, the processor possesses properties that introduce additional latency to the overall QRD calculation time. Even if performed entirely within a single chip such as a single FPGA, the iterative nature of the process and the repeated reading and re-writing of matrix columns in and out of memory may create unacceptable latencies, that require timeframes in the hundreds of milliseconds to complete the calculation of the Q and R matrices. Such timelines are unacceptable for many applications. Decreasing the latency within the QRD process assists in reducing application timelines.

Latency may be reduced by utilizing a parallel, pipelined implementation to perform the many addition and subtraction operations involved in totaling the entries in a matrix column. By performing additions of subtotals of sub-blocks of a column and keeping a running count of the subtotals, the number of clock ticks required to perform the additions is reduced, while keeping the processing pipeline full during all clock cycles. A parallel, pipelined approach reduces latency in an FPGA sufficiently to allow calculation of a large sized matrix entirely within a single FPGA within acceptable timeframes.

Figure 5:
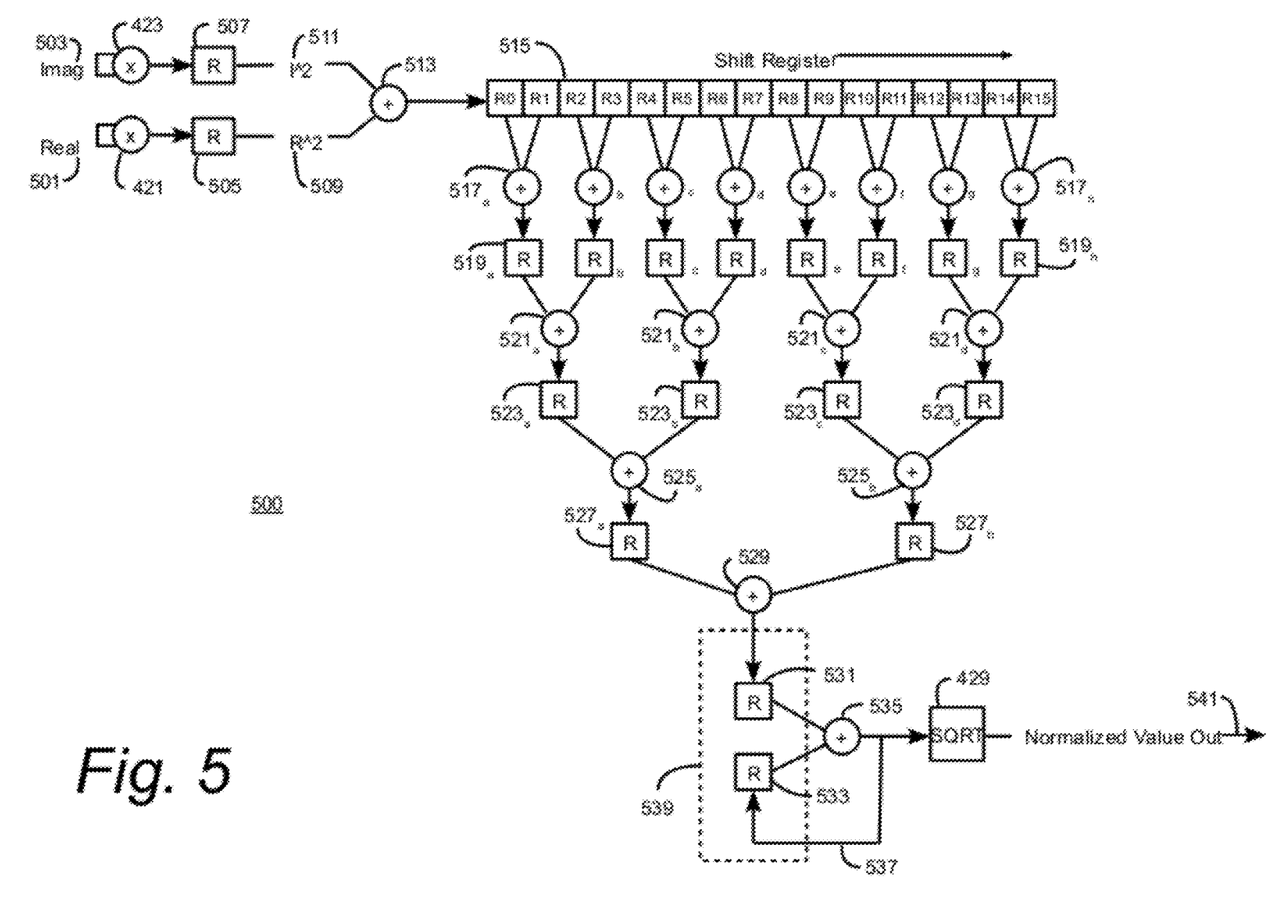
FIG. 5 is a flow diagram depicting a parallel, pipelined architecture for computing sums of column vectors in a normalizer programmable logic module.

FIG. 5 is a block diagram of a parallel, pipelined implementation 500 of the normalizer programmable logic module 411. A column of complex values stored in dual port memory 405 is received at the normalizer programmable logic module 411 with each column value comprising a real portion and an imaginary portion 503. The imaginary portion 503 is squared by multiplying the imaginary portion 503 by itself in multiplier 423. Similarly, the real portion 501 is squared by multiplying the real portion 501 times itself in multiplier 421. The squared values are then stored in registers 505, 507. The squared real portion 509 and the squared imaginary portion 511 are then combined in adder 513. A number of real and imaginary column entries is selected such that shift register 515 is filled. In an exemplary embodiment, shift register 515 comprises 16 registers. In such an embodiment, 16 column entries are processed at a time, squaring and combining the real and imaginary portions of the 16 entries and streaming the squared values into the shift register 515. While the embodiment in FIG. 5 shows a shift register containing 16 registers, any number of registers may be used. Generally, the number of registers in shift register 515 will be a even factor of the number of rows (i.e. the number of column entries) in the input matrix. Each set of two adjacent registers R0-R15 within shift register 515 are put into an adder $517_{a\text{-}h}$ and a subtotal of each pair of column entries are stored in a register $519_{a\text{-}h}$. Each adjacent pair of registers 519 are input to adders $521_{a\text{-}d}$ and added again to create four new subtotals, each new subtotal being a total of the prior two subtotals in registers 519. The four new subtotals are then stored in registers $523_{a\text{-}d}$. The adjacent pairs of registers 523 are summed in adders $525_{a,b}$ and stored in registers $527_{a,b}$. The resultant subtotals in registers $527_{a,b}$ are then added in adder 529. Thus, with each clock cycle, the additions are decimated, from 8 subtotals 519, to 4 subtotals 523, to 2 subtotals 527, to one subtotal 531.

As described above, the number of registers in shift register 515 is generally a whole factor of the number of column entries in the input matrix. In an exemplary embodiment using a 1024×64 input matrix, each column has 1024 entries. Assuming the shift register of FIG. 5, containing 16 registers, the input column is processed in blocks of 16 column entries. Adding each block of 16 entries results in a subtotal of those 16 entries. The 16 entry block subtotal is stored in register 531.

As each block of 16 entries from the input column is processed, a new block of 16 entries is loaded into the shift register 515, thereby keeping the pipeline full as the prior block of entries is subtotaled. As each group of 16 entries is subtotaled, the resulting subtotal 531 is added to the running total of all prior subtotaled entry groups, which is stored in register 533 by way of adder 535. The running total of all prior subtotaled entry groups is achieved through feedback channel 537, which stores an updated running total to register 533. When all the entry groups of the input column are subtotaled, for example, as indicated by a data valid signal 539 from the normalizer state machine 431, the square root of the summed column is calculated by square root calculator 429 and outputs the normalized value 541.

Figure 6:
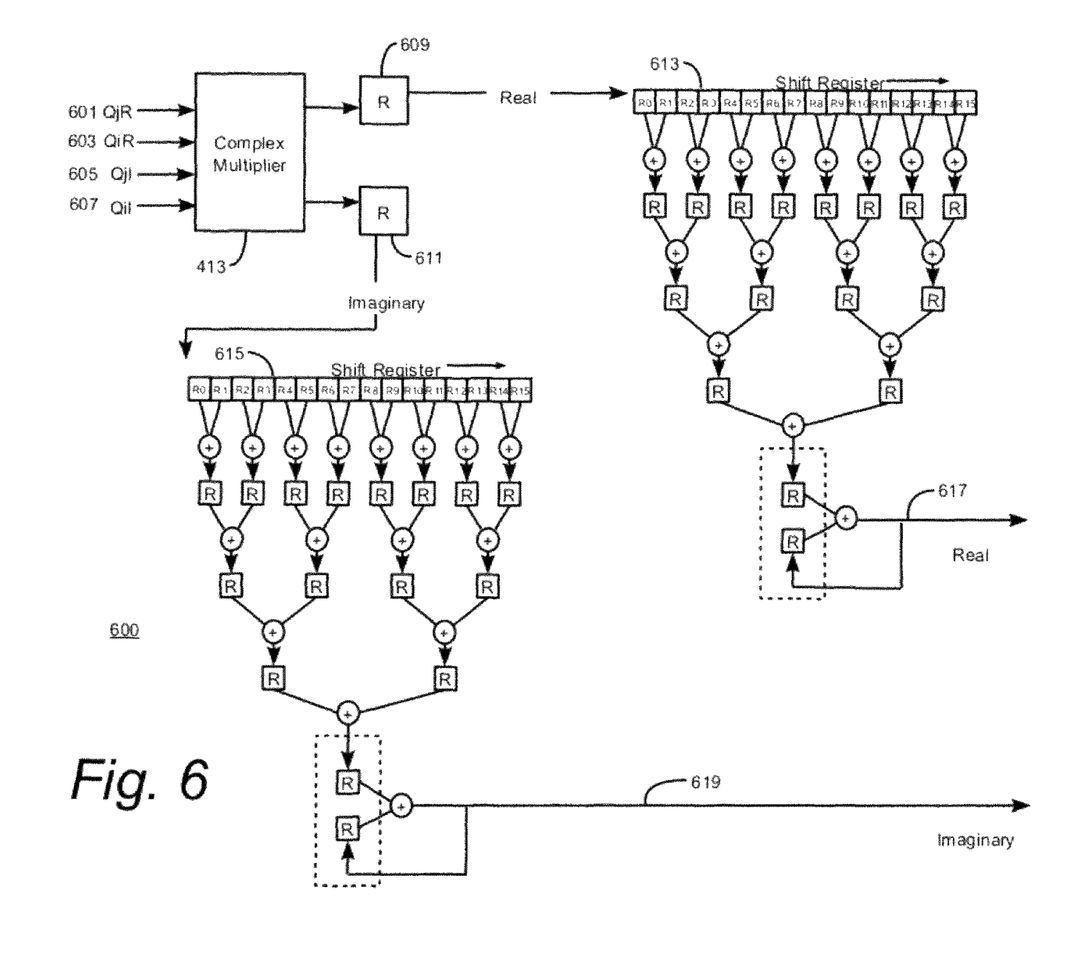
FIG. 6 is a flow diagram depicting parallel, pipelined architecture for computing sums of column vectors in a second programmable logic module.

FIG. 6 is a block diagram of a parallel, pipelined implementation 600 of the complex multiplier 413. The complex multiplier 413, contained in programmable logic module 409, multiplies the column $Q_i$ by the column $Q_j$. Real inputs $Q_iR$ 601 and $Q_jR$ 603 imaginary inputs $Q_iI$ 605 and $Q_jI$ 607 are multiplied in complex multiplier 413. The real result is stored in register 609 and the imaginary result is stored in register 611. The inputs 601-607 are taken in groups of entries from the source columns i and j, in groups sized according to the number of registers in shift registers 613 and 615. The entry blocks are then subtotaled from shift registers 613 and 615 in a manner similar to that discussed above with regard to FIG. 5.

The resultant real total 617 and imaginary total 619 are output to provide a calculated value of R(j,i) according to Equation (6).

Figure 7:
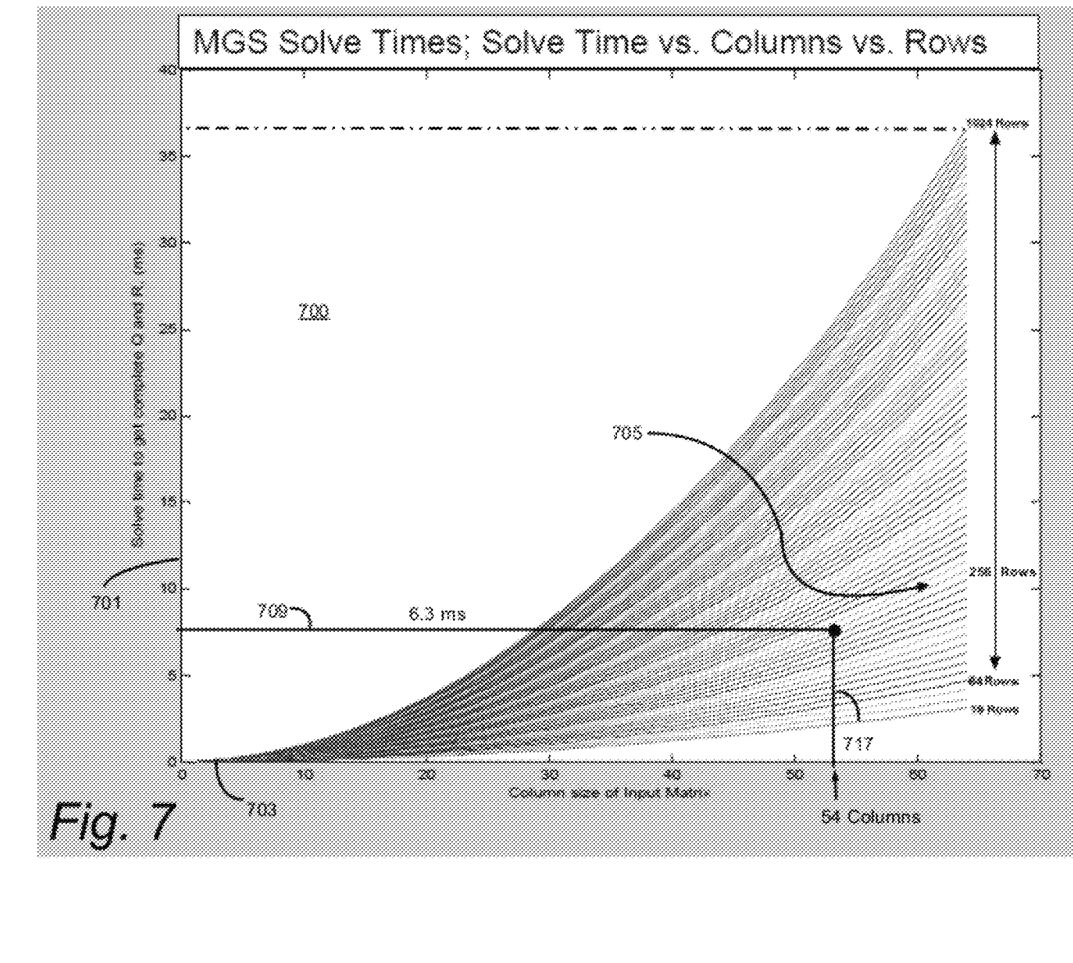
FIG. 7 is a graph showing solve times for an implementation of an MGS QRD algorithm based on the number of rows and columns in an input matrix.

FIG. 7 shows a graph of solve times associated with the MGS-QRD with respect to the number of rows and columns. Referring to FIG. 7, the vertical axis 701 represents the time in milliseconds (ms) that a MGS-QRD core according to an embodiment computes the MGS solution based on a clock rate of 125 MegaHertz (MHz). The horizontal axis 703 represents the number of columns in the input matrix, while each plotted line in the graph 700 represents the number of rows in the input matrix in increments of 16. Referring to the graph 700, using a 125 MHz clock cycle, a 1024×64 matrix is computed in about 37 ms, while a 192×54 matrix is solved in about 6.3 ms. In an embodiment where input Matrix A is a 256×54 matrix, a solve time of about 8 ms 709 is required to process the 256 row matrix 705 with 54 columns 707. As described above, the matrix size may be specified by the user for example, by entering the number of columns and the number of rows in the declaration section of a top level software module which serves as a control input to the MGS core 205.

Figure 8:
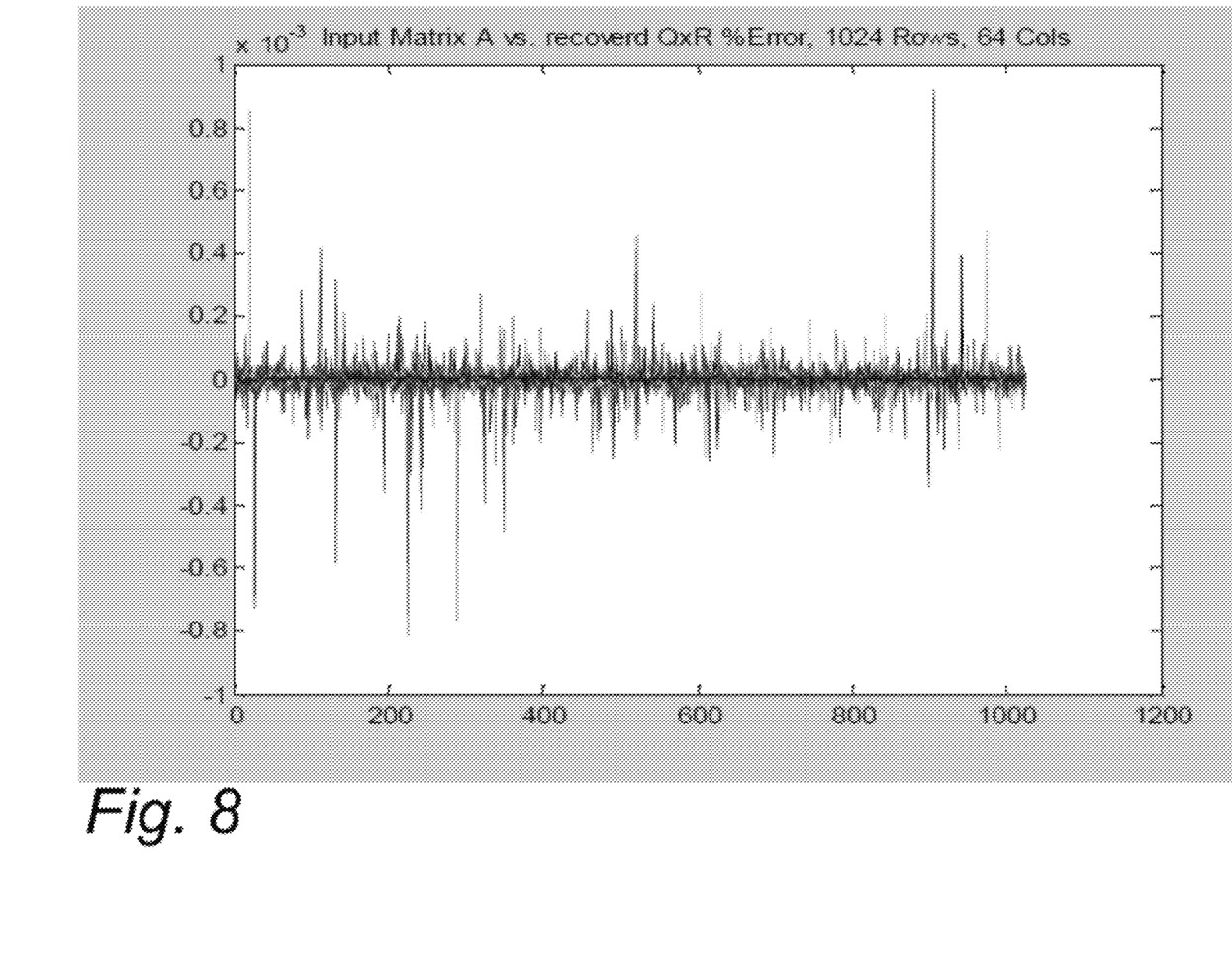
FIG. 8 is graph showing the percentage of error for an input matrix A, compared to a computed Q and R matrix using an implementation of an MGS QRD implementation in a single FPGA.

FIG. 8 illustrates the level of error experienced when recovering original matrix A from the computed Q and R matrices. Matrix A used for this example was a randomly generated 1024×64 complex matrix.

Figure 9:
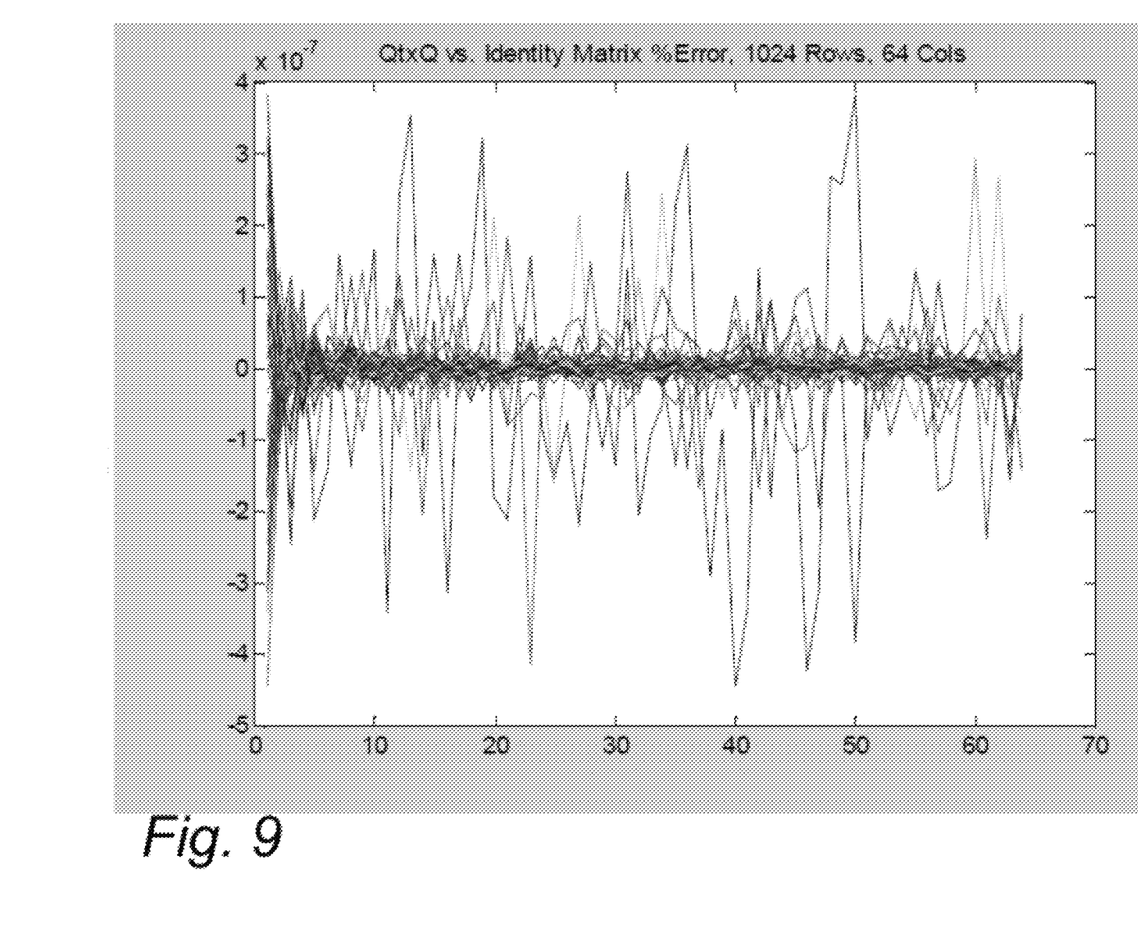
FIG. 9 is a graph showing the percentage of error between the computed identity matrix and the transpose $Q^H Q$ using an implementation of an MGS QRD implementation in a single FPGA.

FIG. 9 compares the computed identity matrix to $Q^HQ$ and shows the percentage of error. Both FIGS. 4 and 5 indicate a low error rate based on a QR decomposition computed in accordance with an embodiment of an MGS QRD processor. This is in contrast to a comparable implementation using fixed point math and a 32 bit vector which result in an error of over 200%. As the size of the matrix increases, the number of divisions grows rapidly and the inherent error caused by using fixed point math also increases.

Figure 10A:
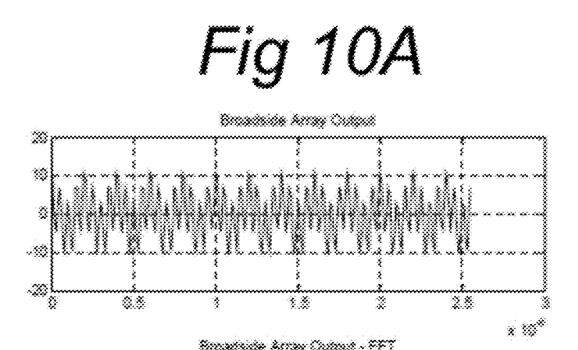
FIG. 10A is a graphical illustration of a broadside array output signal before beamforming.
Figure 10B:
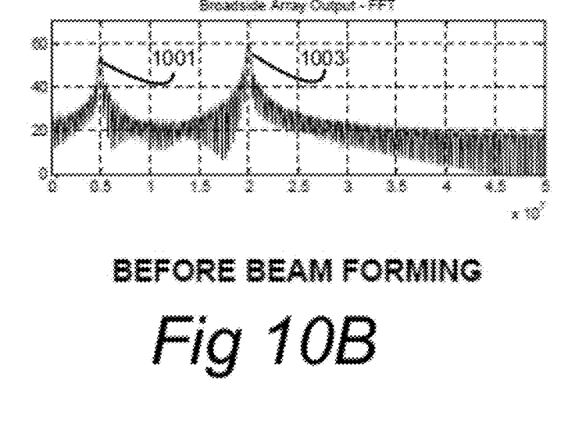
FIG. 10B is a graphical illustration of a Fourier transform of the broadside array output signal before beamforming.

FIG. 10A-D are graphical representations showing the results of a beam forming algorithm using an MGS-QRD in accordance with an exemplary embodiment. A MGS-QRD VHDL implementation of an embodiment is simulated in MATLAB. The simulation was verified in testing to be bit accurate to the MGS-QRD core placed and routed into an FPGA targeted as Xilinx Virtex5 SX 95t FPGA. The MGS-QRD implementation was simulated in MATLAB as a generalized side lobe canceller. The MGS-QRD was utilized to perform a least squares computation to generate optimum antenna receiving weights. The array was configured with four sensors and the signal of interest was received broadside with an amplitude 1 per element and a frequency of 5 MHz. An interferer amplitude 2 per element at 20 MHz and a phase of 0.1 was also introduced. FIGS. 10A and 10B illustrate the broadside signal containing noise and the interferer signal. FIG. 10B shows the fast Fourier transform (FFT) of the broadside array output and clearly shows lobes at 5 MHz 1001 and 20 MHz 1003.

Figure 10C:
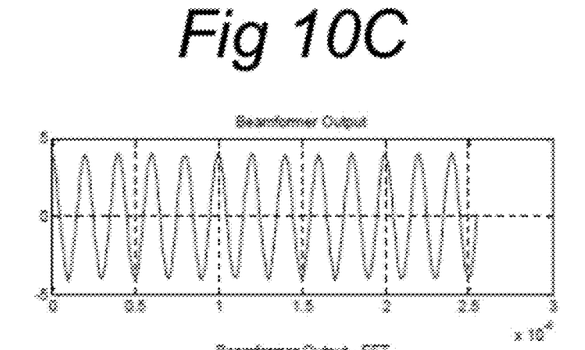
FIG. 10C is a graphical illustration of a broadside array output signal after beamforming.
Figure 10D:
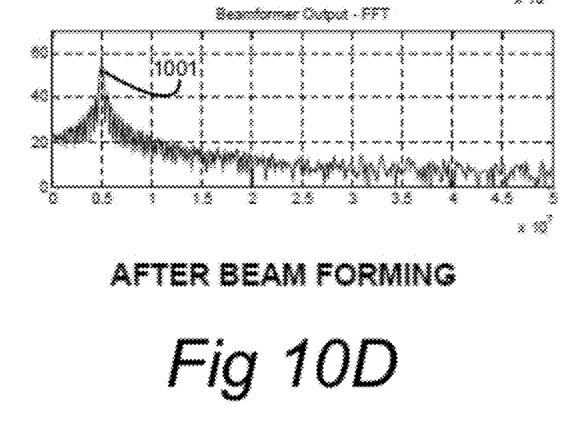
FIG. 10D is a graphical illustration of a Fourier transform of the broadside array output signal after beamforming.

FIGS. 10C and 10D show the simulated output from a beamformer model using the MGS-QRD algorithm used as an MGS QRD implemented in an FPGA. As noted in the FFT of the beamformer output shown in FIG. 10D, the interferer side lobe at 20 MHz 1003 has been effectively eliminated.

Figure 11:
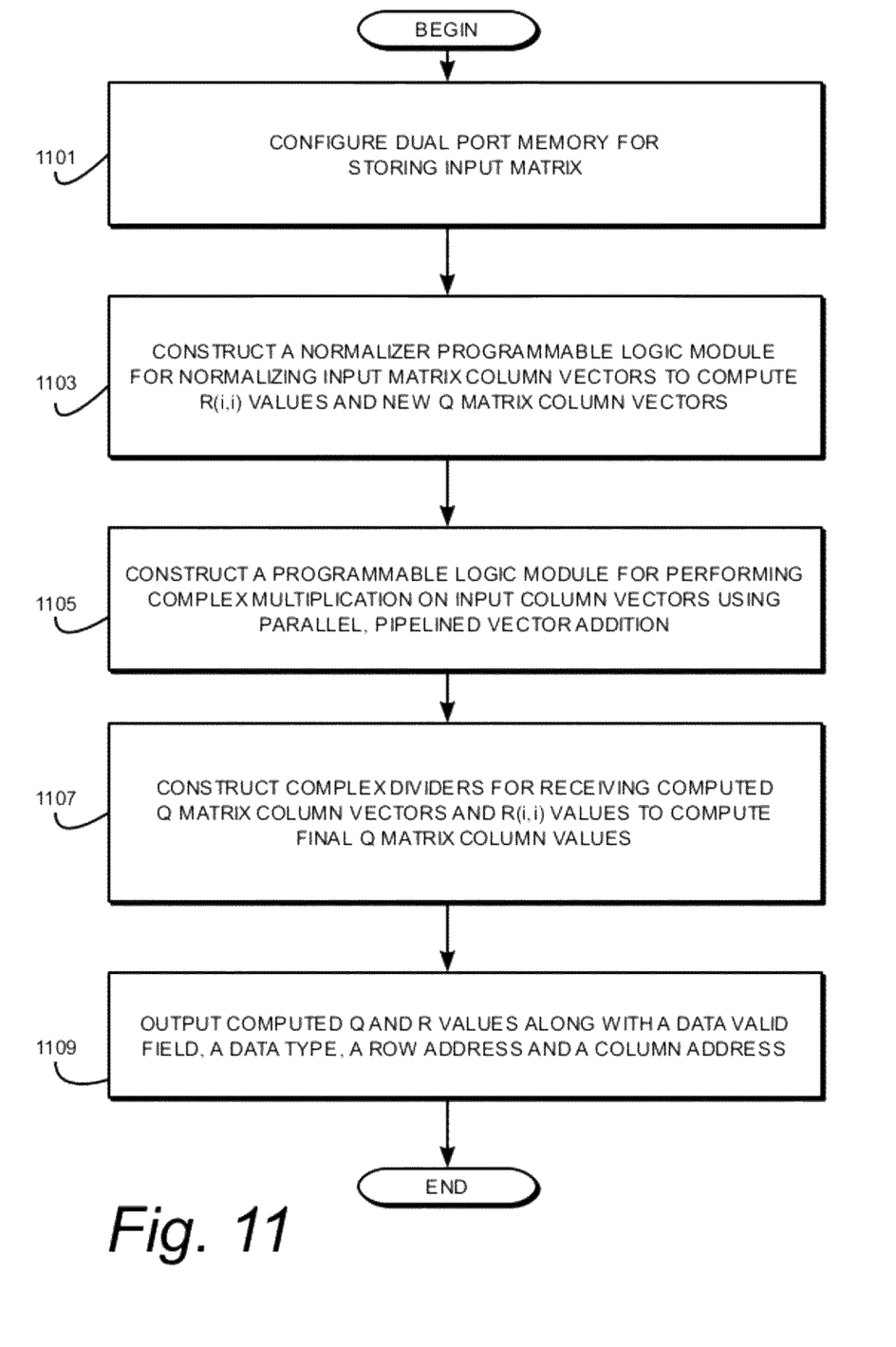
FIG. 11 is a block diagram showing a method of implementing an MGS QRD implementation in a single FPGA.

Referring now to FIG. 11, there is shown a flow diagram of a method for implementing an MGS QRD in an FPGA 1100. A dual port memory is configured such that the dual port memory is of sufficient size to store an input matrix of predetermined dimensions. The size of the input matrix may be specified by parameters specifying the number or rows and columns in the input matrix, and the dual port memory is subsequently configured to hold complex values corresponding to the number of rows and columns as shown in block 1101.

A normalizer programmable logic module is constructed which performs the calculations necessary to perform computations for normalizing an input matrix column vector to compute a value for R(i,i) according to:

$$R(i,i)=\text{norm}(Q(:,i));  \qquad \text{Equation (8)}$$

New Q matrix column vectors are computed according to:

$$Q(:,i)=Q(:,i)/R(i,i);  \qquad \text{Equation (9)}$$

and the resultant Q matrix column is written back to the dual port memory as shown in block 1103.

A second programmable logic module is constructed to perform complex multiplication operations on two input matrix columns according to:

$$R(j,i)=Q(:,j)^*Q(:,i);  \qquad \text{Equation (6)}$$

The complex multiplication is carried out using a parallel, pipelined implementation based on a plurality of adders configured to decimate the addition of column vectors into a decreasing number of subtotals. The Q matrix column vectors are computed according to:

$$Q(:,i)=Q(:,i)-(R(j,i)^*Q(:,j);  \qquad \text{Equation (7)}$$

and written back to the dual port memory as shown in block 1105.

A pair of complex dividers are constructed to receive the computed value of R(i,i) from block 1103 and the computed Q matrix column vectors computed in blocks 1103 and 1105 and divide the Q matrix column vectors by the computed value of R(i,i) to compute the final Q matrix values as shown in block 1107.

The computed final Q matrix and R matrix elements are output along with indicators including a data valid indicator, a data type indicator, a row address and a column address as shown in block 1109.

Some aspects of implementing an MGS QRD in a single FPGA may be performed in software. Software may take the form of instructions stored upon a non-transitory machine-readable medium. The instructions, when executed by a processor may cause the processor to perform various functions or perform process steps in implementing an MGS QRD in an FPGA. For example, software instructions may configure a processor to generate a binary file, the binary file configured to serve as an input to a place and route software utility for physically implementing an FPGA logic design in a semiconductor device. Other uses of software in implementing an MGS QRD in an FPGA may be conceived that remain within the scope and spirit of this specification.

While the foregoing describes exemplary embodiments and implementations, it will be apparent to those skilled in the art that various modifications and variations can be made to the present invention without departing from the spirit and scope of the invention.

What is claimed is:

1. A processor for performing a QR decomposition (QRD) according to a modified Gram-Schmidt (MGS) QRD in a single field programmable gate array (FPGA) comprising:
    a converter configured to convert a complex fixed point input to a complex floating point input;
    a dual port memory coupled to said converter and configured to hold complex entries of an input matrix, the input matrix having a pre-determined size;
    a normalizer programmable logic module (PLM) configured to compute a normalization of an input matrix column vector;
    a second PLM configured to perform a complex multiplication operation on two input matrix columns to compute an element of an output matrix R and to further compute an intermediate column of an output matrix Q;
    a scheduler coupled to said normalizer PLM and said second PLM and configured to divert control of the QRD processing to one of the normalizer PLM and the second PLM;
    a top level state machine in communication with said scheduler and configured to monitor processing in the normalizer PLM and the second PLM and communicate completion of a given operation to the scheduler;
    a complex divider coupled to said memory and said normalizer PLM and configured to receive the computed normalization of the input matrix column vector and the intermediate column of the output matrix Q and compute a final column for output matrix Q;
    a multiplexer coupled to said complex divider and to said normalizer PLM and configured to output a computed complex value as an element of one of output matrix Q and output matrix R.

2. The processor of claim 1, wherein the complex divider comprises a first divider that divides real portions of a complex matrix element, and a second divider that divides imaginary portions of a complex matrix element.

3. The processor of claim 1, wherein the normalizer PLM further comprises a plurality of adders configured in a parallel pipelined implementation and operative to calculate subtotals of entries of an input matrix column and decimate the number of subtotal additions for each subsequent clock cycle.

4. The processor of claim 1, wherein the second PLM comprises a complex multiplier and a plurality of adders configured in a parallel pipelined implementation and operative to calculate subtotals of entries of an input matrix column and to decimate the number of subtotal additions for each clock cycle.

5. The processor of claim 1, wherein the output matrix Q and the output matrix R are output to an adaptive filtering processor.

6. The processor of claim 1, wherein all computations of the MGS QRD are performed using floating point arithmetic.

7. A method of implementing a modified Gram-Schmidt (MGS) QR decomposition (QRD) in a single field programmable gate array (FPGA), wherein the MGS QRD decomposes an input matrix A into an output matrix Q and an output matrix R, the method comprising:
    normalizing a column of the input matrix to compute an element of an R matrix, R(i,i), wherein the elements of the input matrix column are added in a parallel pipelined fashion, thereby decimating a number of sub-total additions performed in each clock cycle;
    multiplying two columns of the input matrix to compute an element of the R matrix R(j,i), wherein products of the multiplying are added in a parallel pipelined fashion, thereby decimating the number of sub-total additions performed in each clock cycle;
    calculating an intermediate column vector for the Q matrix;
    calculating a final column vector for the Q matrix using a complex divider to divide the intermediate column vector by the computed matrix element R(i,i); and
    outputting a calculated element of one of output matrix Q and output matrix R.

8. The method of claim 7, wherein the step of calculating a final column vector for the Q matrix using a complex divider to divide the intermediate column vector further comprises dividing real portions of a complex output matrix element in a first module and dividing imaginary portions of a complex output matrix element in a second module.

9. The method of claim 8, further comprising outputting the calculated element of one of output matrix Q and output matrix R to an adaptive filtering processor.

10. The method of claim 8, further comprising converting elements of the input matrix A to floating point values.

11. The method of claim 10, further comprising using floating point operations to perform the MGS QRD.

12. A non-transitory machine-readable medium upon which are stored instructions, the instructions when executed by a processor cause the processor to perform the steps of:
    normalizing a column of the input matrix to compute an element of an R matrix, R(i,i), wherein the elements of the input matrix column are added in a parallel pipelined fashion and decimate a number of sub-total additions performed in each clock cycle;
    multiplying two columns of the input matrix to compute an element of the R matrix R(j,i), wherein products of the multiplying are added in a parallel pipelined fashion, decimating the number of sub-total additions performed in each clock cycle;
    calculating an intermediate column vector for the Q matrix;
    calculating a final column vector for the Q matrix using a complex divider to divide the intermediate column vector by the computed matrix element R(i,i); and outputting a calculated element of one of output matrix Q and output matrix R.

13. The non-transitory machine-readable medium of claim 12, wherein the processor, upon executing the stored instructions, is further configured to calculate the final column vector for the Q matrix by dividing real portions of a complex output matrix element in a first module and dividing imaginary portions of a complex output matrix element in a second module.

14. The non-transitory machine-readable medium of claim 13, wherein the processor, upon executing the stored instructions, is further configured to perform the steps of outputting the calculated element of one of output matrix Q and output matrix R to an adaptive filtering processor.

15. The non-transitory machine-readable medium of claim 12, wherein the processor, upon executing the stored instructions, is further configured to perform the steps of:
converting elements of the input matrix A to floating point values; and
performing calculations for the MGS QRD using floating point arithmetic.

* * * * *